(12) United States Patent
Hwu et al.

(10) Patent No.: US 8,569,932 B2
(45) Date of Patent: Oct. 29, 2013

(54) MULTI-AXIS ACTUATING APPARATUS

(75) Inventors: En-Te Hwu, Taipei (TW); Ing-Shouh Hwang, Taipei (TW)

(73) Assignee: Academia Sinica, Taipei (TW)

( * ) Notice: Subject to any disclaimer, the term of this patent is extended or adjusted under 35 U.S.C. 154(b) by 84 days.

(21) Appl. No.: 13/252,842

(22) Filed: Oct. 4, 2011

(65) Prior Publication Data
US 2012/0306317 A1  Dec. 6, 2012

(30) Foreign Application Priority Data
Jun. 3, 2011  (TW) .............................. 100119673 A

(51) Int. Cl.
H01L 41/08  (2006.01)

(52) U.S. Cl.
USPC ......................................................... 310/328

(58) Field of Classification Search
USPC ......................................................... 310/328
See application file for complete search history.

(56) References Cited

U.S. PATENT DOCUMENTS

| 3,569,718 | A | * | 3/1971 | Borner .......................... 250/548 |
| 4,727,278 | A | * | 2/1988 | Staufenberg et al. .......... 310/328 |
| 4,785,177 | A | * | 11/1988 | Besocke ................... 250/442.11 |
| 4,877,957 | A | * | 10/1989 | Okada et al. ...................... 850/1 |
| 5,786,654 | A | * | 7/1998 | Yoshida et al. ................ 310/328 |
| 5,900,691 | A | * | 5/1999 | Reuter et al. .................. 310/348 |
| 5,912,527 | A |  | 6/1999 | Karrai |
| 7,196,454 | B2 |  | 3/2007 | Baur et al. |
| 7,872,397 | B2 | * | 1/2011 | Clingman et al. ............. 310/328 |
| 2007/0096600 | A1 | * | 5/2007 | Mavanur et al. .............. 310/328 |

* cited by examiner

*Primary Examiner* — Mark Budd
(74) *Attorney, Agent, or Firm* — Brinks Hofer Gilson & Lione

(57) ABSTRACT

A multi-axis actuating apparatus for a nano-positioning apparatus includes a movable element attached to a sample platform, a plurality of driving elements, and a plurality of actuators. The driving elements frictionally engage the movable element and are configured to selectively move the movable element along a first direction. The plurality of actuators move the plurality of driving elements when driving signals are applied to the plurality of actuators. Different driving signals may be applied to the plurality of actuators to cause different movement of the driving elements such that the movable element has different displacements in different directions along the plurality of driving elements. The movable element is titled due to the different displacements.

23 Claims, 10 Drawing Sheets

MULTI-AXIS ACTUATING APPARATUS

CROSS-REFERENCE TO RELATED APPLICATIONS

This application claims the benefit of TW Application No. 100119773, filed on Jun. 3, 2011, the disclosure of which is incorporated herein by reference.

FIELD

The disclosure relates to positioning apparatuses, and more particularly to multi-axis actuating apparatuses for nano-positioning apparatuses.

BACKGROUND

The statements in this section merely provide background information related to the present disclosure and may not constitute prior art.

Nano-positioning apparatuses have been utilized in a variety of applications, such as micro-scale and nano-scale manipulation devices, scanning electron microscope (SEM), scanning probe microscope (SPM), nano-optic technology, nano-robots, and other micro-scale and nano-scale manufacturing or assembling devices.

One prior art nano-positioning apparatus includes a sample platform that supports a sample thereon and an actuating apparatus connected to the sample platform to move the platform. The platform is first coarsely positioned by a coarse positioning mechanism and later finely positioned in nano-scale by the actuating apparatus.

Referring to FIG. 1A, a prior art single-axis actuating apparatus 1 for a nano-positioning apparatus includes a piezoelectric (PZT) actuator 11, a guiding rod 12, and a movable element 13, which are mounted to a housing 14. The guiding rod 12 functions as a driving element to drive the movable element 13 and is slidably and frictionally engaged to movable element 13. The opposing ends of the guiding rod 12 are attached to membrane F1 and F2. The guiding rod 12 is connected to the PZT actuator 11 through the membrane F1. The PZT actuator 11 elongates or contracts in response to an electrical signal, such as voltage, applied to the PZT actuator.

As shown in FIG. 1B, when a voltage is applied to the PZT actuator to make the PZT actuator 11 elongate in a fast speed, the guiding rod 12 is moved by the PZT actuator 11 in the same direction to have a displacement $\Delta X1$. The linear movement of the guiding rod 12, however, does not cause the movable element 13 to move due to inertia of the movable element 13. The movable element 13 remains in the initial position P1. As shown in FIG. 1C, when the voltage applied to the PZT actuator 11 is gradually decreased to zero, the PZT actuator 11 contracts slowly to the initial non-deformed state and moves the guiding rod 12 back to the initial position. When the guiding rod 12 moves, the movable element 13 that is slidably and frictionally engaged to the guiding rod 12 is moved along with the guiding rod 12 due to static friction between the guiding rod 12 and the movable element 13. As a result, the movable element 13 is moved toward the PZT actuator 11 to have a displacement $\Delta X2$. Therefore, the prior art single-axis actuating apparatus 1 uses the "stick-slip phenomenon" to control movement of the movable element and consequently the movement of the sample platform. The "stick-slip phenomenon" has been described in U.S. Pat. No. 7,196,454 and U.S. Pat. No. 5,912,527.

The prior art actuating apparatus 1 controls movement of the platform only in one direction. To move the platform in three dimensions, three single-axis actuating apparatuses 1 are stacked one above the other to form a multi-axis actuating apparatus, called a serial XYZ actuating apparatus. In the serial XYZ actuating apparatus, Z-axis actuating device is placed on top of X-axis actuating device, which in turn is placed on top of the Y-axis actuating device. For nano-scale positioning, stiffness of the actuating apparatus is critical to the ability to resist vibration to ensure high positioning stability and accuracy. The stacked structure of the serial XYZ actuating apparatus requires higher stiffness than a single-axis actuating apparatus, thereby increasing manufacturing costs.

Moreover, an actuating apparatus carrying a higher load is generally operated at a narrower working bandwidth (i.e., lower moving speed). Therefore, the operating speed of the serial XYZ actuating apparatus is adversely affected.

SUMMARY

The present disclosure provides a multi-dimensional actuating apparatus with millimeter-scale long stroke and sub-nano-scale high resolution. The multi-axis actuating apparatus has high stiffness and working bandwidth for millimeter-scale long distance actuation, sub-nanometer-scale high-resolution scanning or positioning and large angular tilt.

In one form, a multi-axis actuating apparatus for a positioning apparatus includes a multi-axis actuating apparatus for a nano-positioning apparatus includes a movable element attached to a sample platform, a plurality of driving elements, and a plurality of actuators. The driving elements frictionally engage the movable element and are configured to selectively move the movable element along a first direction. The plurality of actuators move the plurality of driving elements when driving signals are applied to the plurality of actuators. Different driving signals may be applied to the plurality of actuators to cause different movement of the driving elements such that the movable element has different displacements along the plurality of driving elements. The movable element is titled due to the different displacements.

In another form, the multi-axis actuating apparatus includes a movable element, a first guiding rod; a second guiding rod, a first actuator, a second actuator, the first guiding rod coupled to the first actuator, the second guiding rod coupled to the second actuator, the first guiding rod and the second guiding rod frictionally engaged to the movable element, and a preload element configured to impose a force normal to interfaces between the guiding rods and the movable element. The guiding rods are configured to transfer different axis motions of the piezoelectric elements to the movable element.

In one feature, the guiding rods have high axial stiffness that are made of carbon fiber or composites or metal alloy material. The guiding rods are made of carbon fiber sticks which have light weight, high radial elasticity and high axial stiffness.

In another features, the preload element is made of elastic material such as rubber, spring, metal thin plate, magnet or magnetic material; when the preload element is magnet, the movable element is made of magnetic material. The preload element is made of rubber ring which provides a mechanical force normal to interfaces between the guiding rods and the movable element. The preload element can be multiple pieces which contact guiding rods and provide forces normal to interfaces between the guiding rods and the movable element.

In other features, the movable element has multiple parallel grooves that the guiding rods are slidingly engaged in the grooves. The movable element is actuated in a direction the same with the actuator actuating direction.

In still other features, the first actuator and the second actuator are arranged in the same direction that coupled to the first guiding rod and the second guiding rod, respectively. The first actuator and the second actuator are driven at the same time or driven respectively. The driving voltage signals for the first actuator and the second actuator are the same or contrary. The driving signals for the first actuator and the second actuator are the same or differential.

In some embodiments, the axial direction of the first actuator and the second actuator are perpendicular or parallel arranged.

In some embodiments, when the first actuator and the second actuator are parallel arranged, the driving signals for actuators are the same or differential.

In some embodiments, when a distance between the movable element and two parallel arranged actuators is larger, the actuation range of the movable element is larger.

In some embodiments, the multi-axis actuating apparatus further comprising a third guiding rod and a third actuator. The third guiding rod is coupled to the third actuator. The third guiding rod is frictionally engaged to the movable element. The third actuator is arranged parallel or perpendicular to the first and the second actuators.

In some embodiments, the multi-axis actuating apparatus further comprising a forth guiding rod and a forth actuator. The forth guiding rod is coupled to the forth actuator. The forth guiding rod is frictionally engaged to the movable element. The forth actuator is arranged parallel or perpendicular to the first, second and third actuators.

The multi-axis actuating apparatus described herein has a number of advantages compare with multi-axis serial actuating apparatus. The movable element is frictionally coupled to multiple guiding rods for actuation in multiple axes. With multiple guiding rods arranged along the same direction, the multi-axis actuating apparatus of the present disclosure has improved stiffness, rigidity, stability, and resistance to vibration. Moreover, no axis actuator or guiding rod is stacked on top of another set of axis actuator and guiding rod. Therefore, the working bandwidth for each axis is the same and not compromised for multiple axis movement.

A variety of signals can be used to control the millimeter scale long distance actuation, sub-nanometer scale high resolution scanning or positioning, large angular tilt caused by the apparatus. For example, embodiments of the apparatus include in which the actuator is controllable by a triangular wave signal, those in which the actuator is controllable by a saw-tooth electrical signal, and those in which the actuator is controllable by any one of the foregoing, whether singly or in combination.

DRAWINGS

The drawings described herein are for illustration purposes only and are not intended to limit the scope of the present disclosure in any way.

Figure 1A:
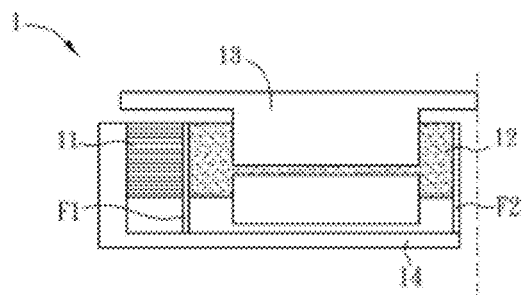
FIG. 1A is a schematic view of a prior art single-axis actuating apparatus.
Figure 1B:
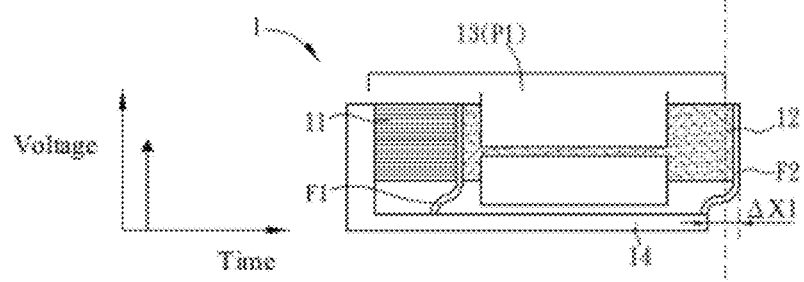
FIG. 1B is a view similar to FIG. 1A, showing a first-stage operation of the single-axis actuating apparatus and the driving signal applied thereto.
Figure 1C:
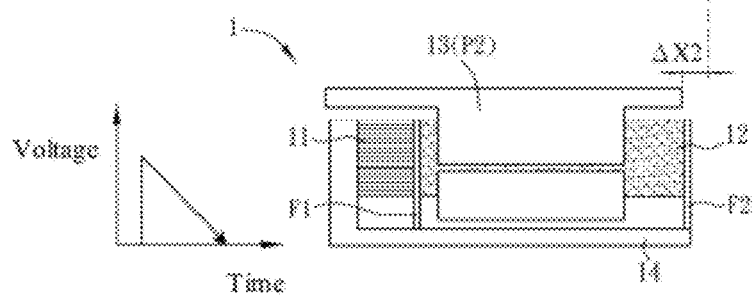
FIG. 1C is a view similar to FIG. 1A, showing a second-stage operation of the single-axis actuating apparatus and the driving signal applied thereto.
Figure 2:
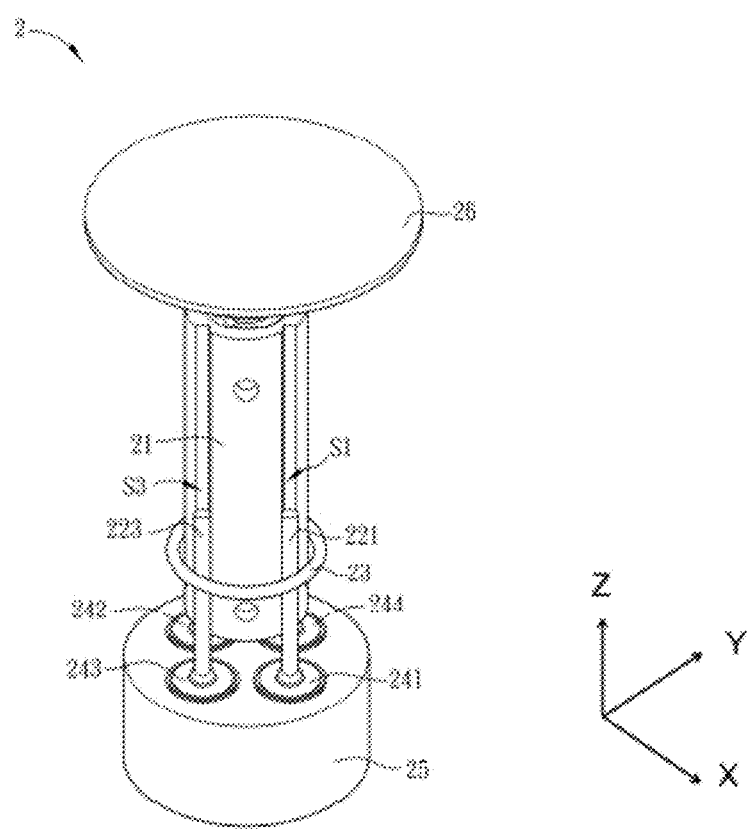
FIG. 2 is a perspective view of a multi-axis actuating apparatus constructed in accordance with a first embodiment of the present disclosure.
Figure 8:
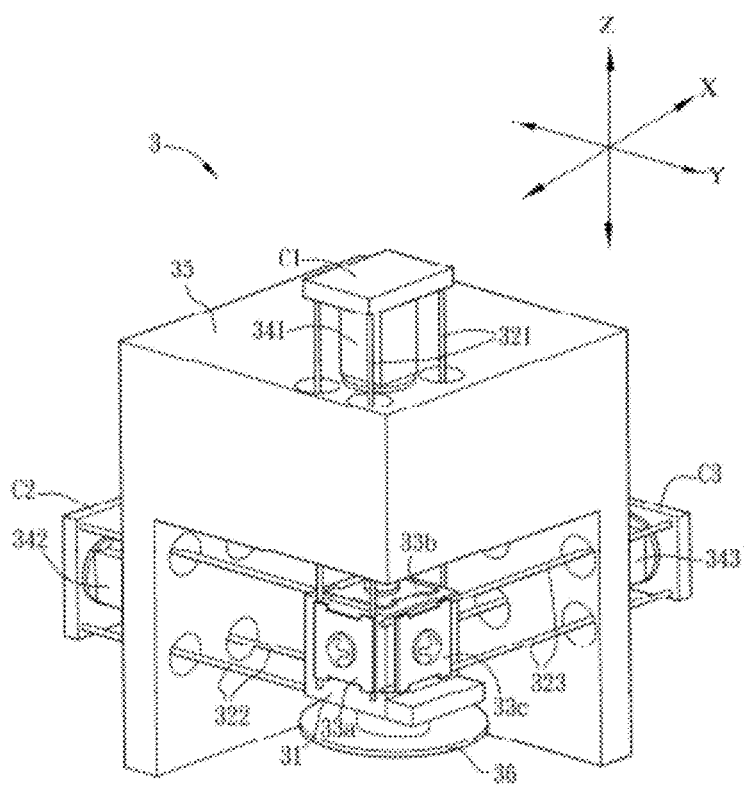
Figure 9:
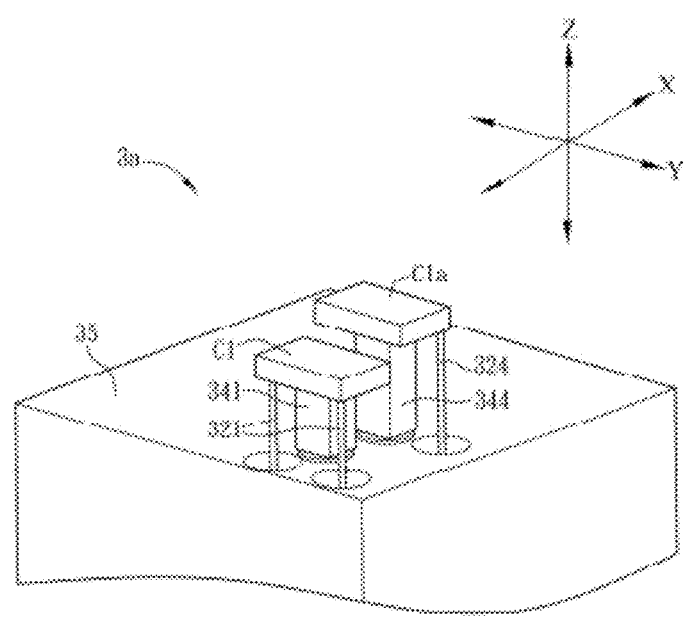
Figure 10:
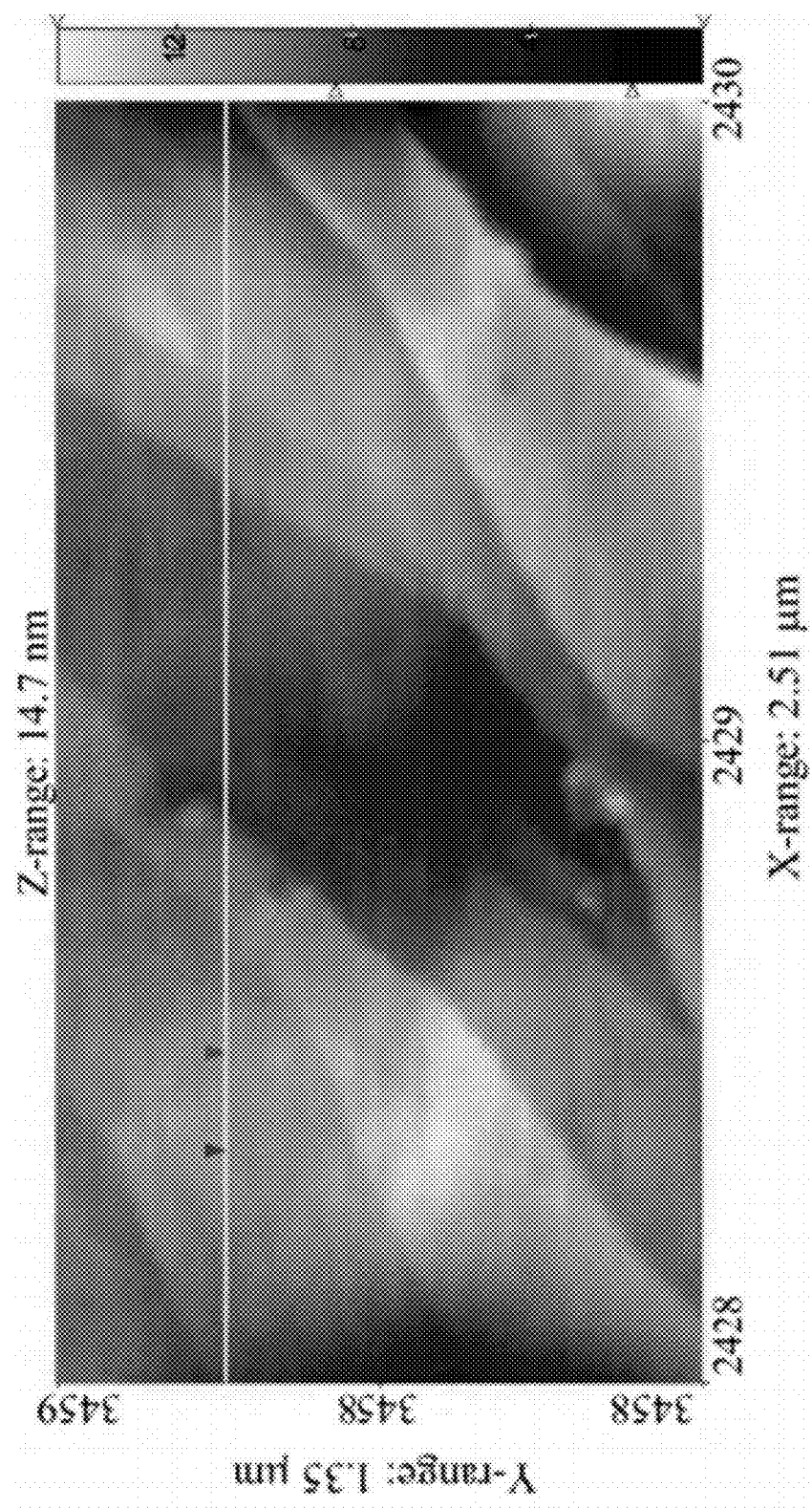
Figure 11:
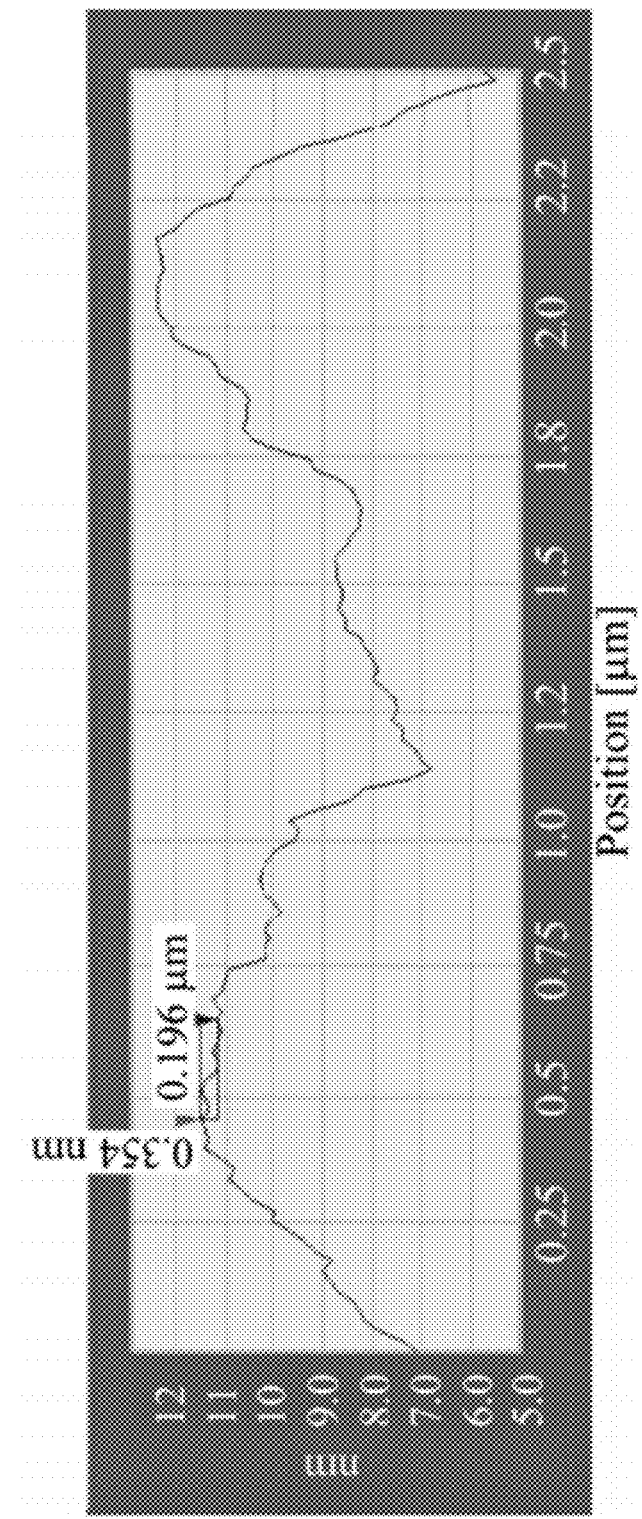

FIGS. 3(a) to 3(e) are schematic views of a multi-axis actuating apparatus of FIG. 2, showing a first operation thereof and the driving signals applied thereto;

FIGS. 4(a) to 4(e) are schematic views of the multi-axis actuating apparatus of FIG. 2, showing a second operation thereof and the driving signals applied thereto;

FIGS. 5(a) and 5(b) are schematic views of the multi-axis actuating apparatus of FIG. 2, showing a third operation thereof and the driving signals applied thereto;

FIGS. 6(a) to 6(d) are schematic views of the multi-axis actuating apparatus of FIG. 2, showing a fourth operation thereof and the driving signals applied thereto;

FIGS. 7(a) to 7(c) are schematic views of the multi-axis actuating apparatus of FIG. 2, showing a fifth operation thereof and the driving signals applied thereto;

FIG. 8 is a perspective view of a multi-axis actuating apparatus constructed in accordance with a second embodiment of the present disclosure;

FIG. 9 is a perspective view of a multi-axis actuating apparatus constructed in accordance with a third embodiment of the present disclosure;

FIG. 10 is topographic image of highly ordered pyrolytic graphite (HOPG) surface measured by a scanning probe microscope that embodies a multi-axis actuating apparatus of the present disclosure; and FIG. 11 is a graph showing a highly ordered pyrolytic graphite (HOPG) surface measured by a scanning probe microscope that embodies a multi-axis actuating apparatus of the present disclosure.

DETAILED DESCRIPTION

The following description is merely exemplary in nature and is in no way intended to limit the present disclosure or its application or uses.

The multi-axis actuating apparatus according to the present disclosure can be used in, including but not limited to, scanning probe microscopes, electron microscopes, micro probes or micro test tube multi-axis adjustment systems, nanoscale multi-axis optical stage, nanoscale multi-axis micro robot, multi-axis platform of optical systems.

First Embodiment

Referring to FIG. 2, a multi-axis actuating apparatus 2 according to a first embodiment of the present disclosure includes a movable element 21, a preload element 23, a housing 25, and a sample platform 26. The movable element 21 has a generally cylindrical configuration and has one end connected to the sample platform 26. The movable element 21 defines a plurality of guiding grooves S1, S2, S3, and S4 along a longitudinal direction of the movable element 21 and on an outer peripheral surface of the movable element 21.

The actuating apparatus 2 further includes a plurality of actuators 241, 242, 243, 244 and a plurality of driving elements 221, 222, 223, 224 corresponding to the plurality of actuators 241, 242, 243, 244. The first and second actuators 241 and 242 are aligned along X axis. The third actuators 243 and 244 are aligned along Y axis. The driving elements 221, 222, 223, 224 extend along Z axis to transfer movement of the plurality of actuators 241, 242, 243, 244 to the movable element 21 along Z axis. While four actuators and four driving elements are shown, it is understood that any number of the actuators and driving elements can be used without departing from the scope of the present disclosure. The driving elements 221, 222, 223, 224 may be configured to be guiding rods that are slidably and frictionally received in and engage the guiding grooves S1, S2, S3 and S4.

The plurality of guiding rods 221, 222, 223, 224 each includes one end connected to a corresponding one of the actuators 241, 242, 243, 244 and thus are supported on the housing 25 through the actuators 241, 242, 243, and 244. The guiding rods 221, 222, 223, 224 can be made of carbon fiber, composites or metal alloy material. In this embodiment, the guiding rods 221, 222, 223, 224 are made of carbon fiber sticks which have light weight, high radial elasticity and high axial stiffness.

While the driving elements are shown to be in the form of guiding rods 221, 222, 223, 224 and are arranged in parallel, it is understood that the driving elements may have other configuration and may be oriented at an angle relative to one another without departing from the scope of the present disclosure.

The plurality of actuators 241, 242, 243, and 244 each have one end connected to the housing 25 and the other end connected to the plurality of guiding rods 221, 222, 223, 224. The plurality of actuators 241, 242, 243, 244 are disposed in substantially the same plane on the housing 25 and provide an actuating force along a longitudinal direction (e.g. Z axis) of the guiding rods 221, 222, 223, 224 and consequently the longitudinal direction of the movable element 21. While not shown in the drawings, it is understood that the plurality of actuators 241, 242, 243, 244 may be arranged to provide a lateral movement normal to the guiding rods 221, 222, 223, 224.

The plurality of actuators 241, 242, 243, 244 each include a pair of driving electrodes (not shown) and a PZT material (not shown) therebetween. The driving electrodes may include copper, gold silver or alloys. The piezoelectric material may include single crystal, thin film, polymer, ceramic material or composite material. The single crystal may include quartz, tourmaline, Rochelle salts, rare-earth tantalite (RETaO$_4$) or niobate. The thin film material may include Zirconia (Z$_r$O$_2$). The ceramic materials may include barium titanate (BaTiO$_3$) or Lead Zirconate Titanate (PZT). The composite material may include Polyvinylidene Fluoride and Pb(ZrTi)O$_3$. The piezoelectric material may have a single piece configuration or a stacked structure including multiple piezoelectric material pieces.

Alternatively, the plurality of actuators 241, 242, 243, 244 may include magnetic linear motors.

When a driving signal, for example, in the form of voltage, is applied to the driving electrodes, the piezoelectric material elongates and contracts so that the actuators 241, 242, 243, 244 move the guiding rods 221, 222, 223, 224 that are attached to the actuators 241, 242, 243, 244 along +Z or −Z direction.

The preload element 23 has a generally circular configuration and surrounds and contacts the plurality of guiding rods 221, 222, 223, 224 to impose a force normal to interfaces between the guiding rods 221, 222, 223, 224 and the movable element 21. The preload element 23 maintains the guiding rods 221, 222, 223, 224 in frictional contact/engagement with the movable element 21. The guiding rods 221, 222, 223, 224 are configured to transfer different movement of the actuators 241, 242, 243, 244 to the movable element 21.

The preload element 23 may be made of elastic materials, such as rubber, spring, metal thin plate, or magnetic material. As an example, the preload element 23 in this embodiment is made of rubber ring which provides a mechanical force normal to interfaces between the guiding rods 221, 222, 223, 224 and the movable element 21. The preload element 23 may be a single-piece or multiple-piece component. For example, the preload elements 23 may include a plurality of magnets or magnetic material adjacent to the plurality of guiding rods 221, 222, 223, 224. The movable element 21 may include magnetic materials or magnet to attract the preload elements 23.

When at least one of the plurality of actuators 241, 242, 243, 244 elongates or contracts, the corresponding one(s) of the plurality of guiding rods 221, 222, 223, 224 is/are moved accordingly. The movable element 21 may or may not be moved by the guiding rods 221, 222, 223, 224 based on how the driving signals are applied to the actuators 241, 242, 243, 244.

Referring to FIGS. 3 to 7, the operation of the multi-axis actuating apparatus 2 is explained in more detail below. Only two actuators 241, 242, two guiding rods 221, 222, the movable element 21, and the housing 25 are shown for clarify. The first and second actuators 241 and 242 are aligned along X axis and thus can cause angular movement of the movable element 21 in the X-Z plane, as well as a linear movement of the platform 26 along X axis. Similarly, the third and fourth actuators 243 and 244 are aligned along Y axis and can cause angular movement of the movable element 21 in the Y-Z plane, as well as a linear movement of the platform 26 on the Y axis. Either set of the actuators 241, 242, 243, 244 can cause a linear movement of the movable element 21 in Z axis.

Figure 3:
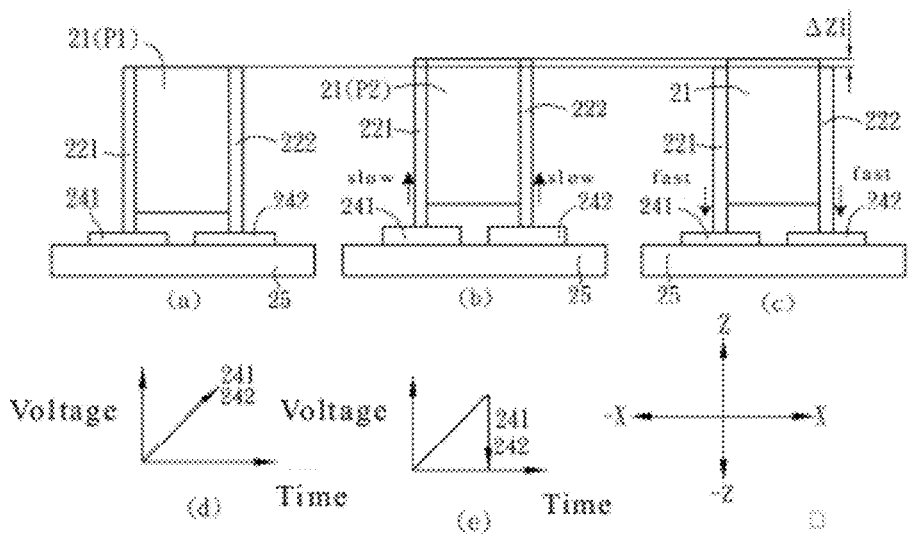

Referring to FIG. 3, the multi-axis actuating apparatus 2 is operated in a first mode, which is an inertial stepping mode. The inertial stepping mode can be used for a long range (in millimeter scale) actuation/movement of the movable element 21. As shown in FIG. 3(a), the movable element 21 is in a first (initial) position P1 when the actuators 241 and 242 are in the initial non-deformed condition. A driving signal in the form of voltage is applied to the actuators 241, 242. As the voltage gradually increases as shown in FIG. 3(d), the actuators 241, 242 slowly elongate in +Z direction and move the guiding rods 221, 222 accordingly in +Z direction. The guiding rods 221, 222 in turn move the movable element 21 upward (in the +Z direction) to a second position P2 (FIG. 3(b)) due to frictional engagement (by the static frictional force) between the guiding rods 221, 222 and the movable element 21. Thereafter, the voltage is quickly dropped to zero as shown in FIG. 3(e). The actuators 241, 242 contract in a fast speed and move in −Z direction. As a result, the guiding rods are moved in a fast speed in −Z direction. The fast movement of the guiding rods 221, 222, however, does not move the movable element 21 down due to inertia of the movable element 21. The movable element 21 stays in the second position P2 as shown in FIG. 3(c). Therefore, the movable element 21 and the sample platform 26 attached to the movable element 21 have a displacement of ΔZ1 along the Z direction, which is the distance between the first position P1 and the second position P2. By repeatedly applying the sawtooth-waveform or inverted sawtooth-waveform driving signals to the actuators 241, 242, the movable element 21 can have a long-stroke displacement in millimeter scale along +Z or −Z direction.

Figure 4:
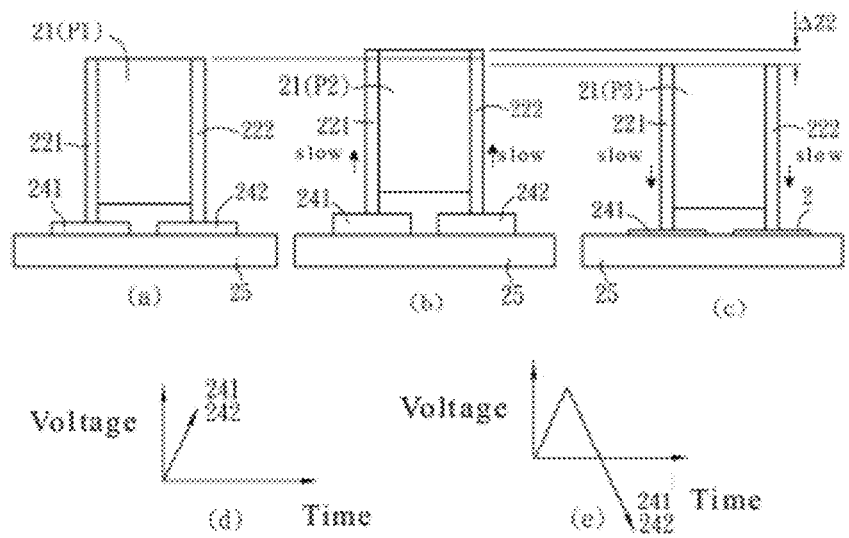

Referring to FIG. 4, the multi-axis actuating apparatus 2 is operated in a second mode, which is the scanning mode. The voltage applied to the actuators 241, 242 is gradually increased, causing the actuators 241, 242 to elongate slowly. The guiding rods 221, 222 are moved by the actuators 214 slowly in +Z direction. The slow movement of the guiding rods 221, 222 causes the movable element 21 to move slowly in +Z direction from a first position P1 (FIG. 4(a)) to a second position P2 (FIG. 4(b)) due to static friction between the guiding rods 221, 222 and the movable element 21. No sliding or skidding occurs between the guiding rods 221, 222 and the movable element 21.

Next, the voltage is slowly decreased to zero and then a negative voltage is applied as shown in FIG. 4(e), the actuators 241, 242 slowly contract to the initial position P1 and continues to contract to a size smaller than the initial dimension. The movable element 21 is thus moved to a third position P3, which is lower than the first position P1, as shown in FIG. 4(c). Therefore, the movable element 21 has a displacement ΔZ2, which is the distance between the first position P1 and the third position P3. By adjusting the voltage applied to the actuators 241, 242, the movable element 21 can be continuously moved in +Z and −Z direction for sub-nanometer-scale high resolution scanning or positioning.

Figure 5:
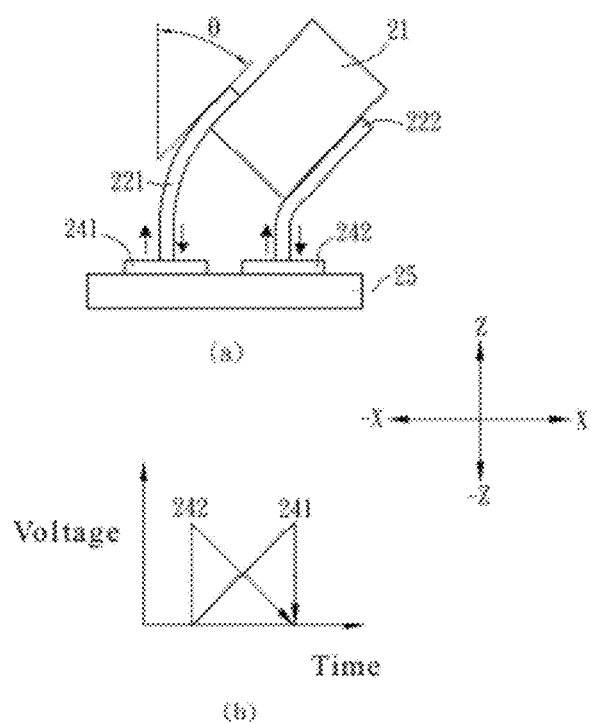

Referring to FIG. 5, the multi-axis actuating apparatus 2 is operated in a third mode, i.e., an angular inertial stepping mode. In this mode, the movable element 21 can be tilted by applying different driving signals to the actuators 241, 242, which are differentially elongated or contracted. As shown in FIG. 5(b), voltage applied to the actuator 241 is slowly increased and abruptly decreased to zero, whereas the voltage applied to the actuator 242 is abruptly increased and slowly decreased to zero.

When the voltage applied to the (first) actuator 241 is slowly increased, the first actuator 241 elongates and moves the (first) guiding rod 221, which in turn moves the movable element 21 due to static frictional engagement therebetween. When the voltage is abruptly decreased to zero, the actuator 241 contracts and returns to the initial position and moves the (first) guiding rod 221 in the −Z direction. The movement of the first guiding rod 221, however, does not move the movable element 21 due to inertia. Therefore, the first side of the movable element 21 adjacent to the guiding rod 221 has a first positive displacement in +Z direction.

In contrast, when the voltage applied to the (second) actuator 242 is abruptly increased, the second actuator 242 elongates and moves the (second) guiding rod 222. The quick movement of the second guiding rod 222, however, does not move the movable element 21 due to inertia of the movable element 21. When the voltage applied to the second actuator 242 is gradually decreased to zero, the second actuator 242 contracts to the initial position and moves the second guiding rod 222 in −Z direction. The slow movement of the second guiding rod 222 causes the movable element 21 to move in −Z direction due to static frictional engagement between the movable element 21 and the second guiding rod 222. The movable element 21 is moved to a position lower than the initial position. Therefore, the movable element 21 has a second negative displacement in −Z direction.

When the first and second guiding rods 221, 222 transfer movement to the movable element 21, the first and second guiding rods 221, 222 only move the sides of the movable element 21 adjacent to the first and second guiding rods 221, 222, rather than the entire body of the movable element 21. Therefore, the different displacements along the opposing sides of the movable element 21 result in tilting of the movable element 21. In this example, the side of the movable element 21 adjacent to the first guiding rod 221 has a positive displacement and the side of the movable element 21 adjacent to the second guiding rod 222 has a negative displacement. Therefore, the movable element 21 is tilted toward the side adjacent to the second guiding rod 222 and defines an angle θ relative to the Z axis. The different driving signals applied to the first and second actuators 241 and 242 results in an angular movement of the movable element 21 in the X-Z plane.

Similarly, different driving signals applied to the third and fourth actuators 243 and 244 would result in an angular movement of the movable element 21 in the Y-Z plane.

Figure 6:
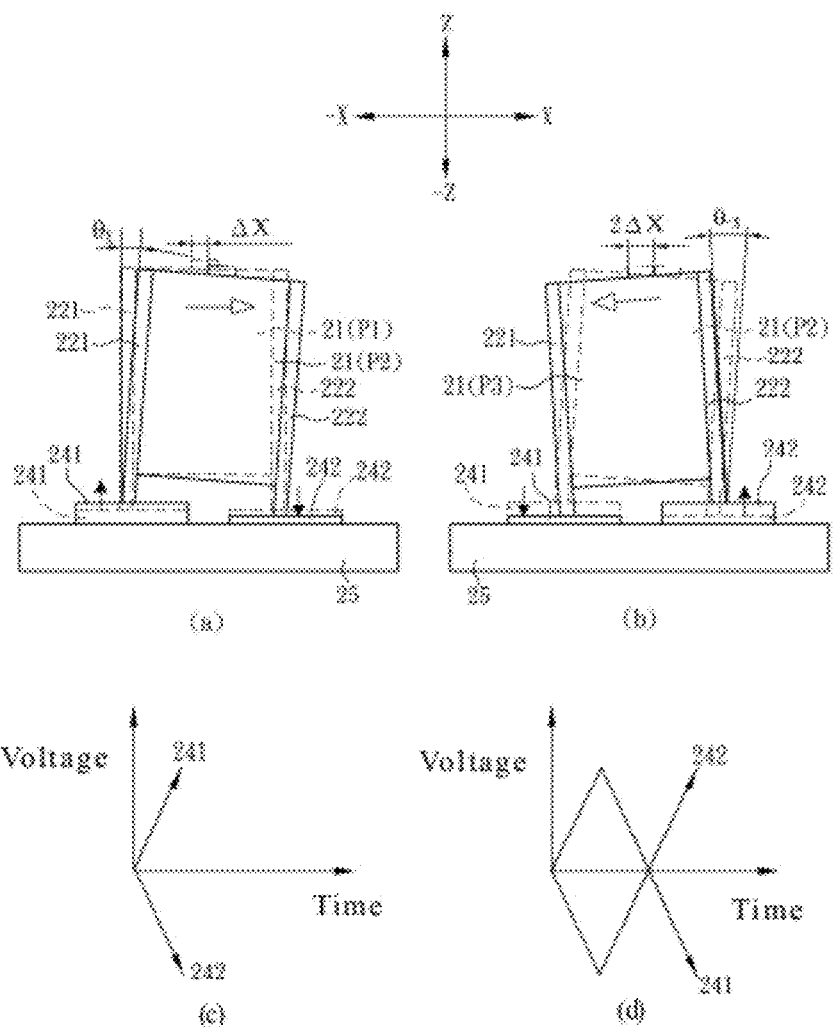

Referring to FIG. 6, the multi-axis actuating apparatus 2 may be operated in a fourth mode, i.e., an angular scanning mode. The actuator 241 and the actuator 242 are differently deformed by applying different driving signals to the first and second actuators 241, 242. The first and second actuators 241 and 242 are aligned along the X axis. As shown in FIGS. 6(c) and 6(d), the voltage applied to the first actuator 241 is gradually increased in the first stage and gradually decreased to zero in the second stage and continues to decrease in the third stage. The voltage applied to the second actuator 242 is gradually decreased in the first stage, gradually increased to zero in the second stage, and continues to increase in the third stage.

In the first stage, the first actuator 241 elongates and moves the guiding rod 221, which in turn moves the movable element 21 so that the movable element has a first positive displacement. The second actuator 242 contracts and moves the guiding rod 222 in the −Z direction. The guiding rod 222 moves the movable element 21 in the −Z direction to have a second negative displacement. The positive displacement of the movable element 21 adjacent to the first guiding rod 221 and the negative displacement of the movable element 21 adjacent to the second guiding rod 222 cause the movable element 21 to tilt toward the second guiding rod 222 and moved from a first position P1 to a second position P2. The movable element 21 defines an angle $\theta_x$ relative to the Z axis. Because the angular movement of the movable element 21 is very small, the radial movement of the top surface of the movable element 21 is close to a linear movement ΔX. The sample platform 26 is mounted on the top surface of the movable element 21.

In the second stage, the movable element 21 is titled back to the initial first position P1 by applying reverse driving signals to the first and second actuators 241, 242. Therefore, the first actuator 241 contracts to the initial position and the second actuator 242 elongates to the initial position. The first and second guiding rods 221, 222 and the movable element 21 are moved to the initial first position P2.

In the third stage, the reversed driving signals continue to be applied to the first and second actuators 241, 242. As a result, the first actuator 241 continues to contract and the second actuator 242 continues to elongate. In the third stage, the operation of the multi-axis actuating apparatus 2 and the movement of the movable element 21 are similar to those in the first stage except for the direction due to the reversed driving signals. Accordingly, the movable element 21 is tilted from the first position P1 to the third position P3 and defines an angle $\theta_{-x}$. Similarly, the top surface of the moveable element 21 has a negative linear movement −ΔX.

In this mode, the movable element 21 has an angular movement from $\theta_x$ to $\theta_{-x}$, and the top surface of the movable element 21 has a linear movement of approximately 2ΔX. Therefore, the sample platform 26 (shown in FIG. 3) has a linear movement of approximately 2ΔX. This angular scanning mode provides a sub-nanometer high resolution scanning or positioning in X axis. The operation as described above in this embodiment can be similarly applied to the third and fourth actuators 243, 244 which are aligned along the Y axis for similar angular scanning along Y axis.

It is understood that both angular inertial stepping mode and high resolution scanning can also be done by actuating only one of the first and second actuators 241, 242 to create the different displacements along the sides of the movable element 21 adjacent to the first and second guiding rods 221, 222.

Figure 7:
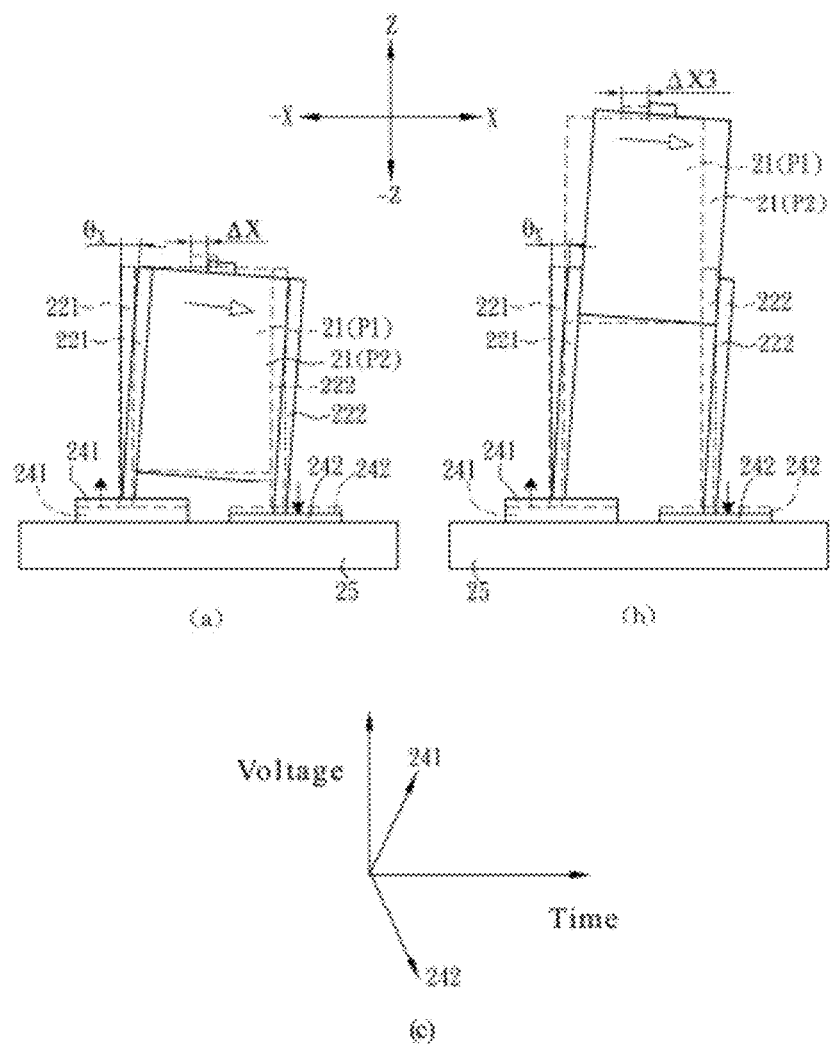

Referring to FIG. 7, the linear movement of the top surface of the movable element 21 along X axis can be amplified for the same tilting angle $\theta_x$ when the movable element 21 is moved to a higher position from the housing 25. The first actuator 241 and the second actuator 242 are differentially deformed by applying the driving signals as shown in FIG. 7(c). The movable element 21 is tilted at a small angle $\theta_x$ from the first position P1 to the second position P2. After the movable element 21 is titled, the movable element 21 is moved up and away from the housing 25 as shown in FIG. 7(b). The linear movement of the top surface of the movable element 21 is increased to ΔX3 for the same degree of angular movement.

Accordingly, the multi-axis actuating apparatus 2 of the present disclosure can be operated in different modes for different functions. The inertial stepping mode as shown in FIG. 3 can provide millimeter scale coarse linear movement in Z axis. The scanning mode as shown in FIG. 4 can provide sub nanometer scale fine scanning or positioning in Z axis. The angular inertial stepping mode as shown in FIG. 5 can provide large angular tilt. The angular scanning mode as shown in FIG. 6 can provide sub-nanometer scale fine scanning or positioning in X and Y axis. Furthermore, the angular scanning range can be adjusted for the same scanning angle as shown in FIG. 7. Therefore, the multi-axis actuating apparatus 2 of the present disclosure can replace both coarse adjustment mechanism and fine scanning XYZ piezoelectric scanner in a scanning probe microscope (SPM).

The driving signal described above is only exemplary. Different driving signals can be applied for a particular actuation to move the movable element 21 and consequently the sample platform 26 to a specific position.

Second Embodiment

Referring to FIG. 8, a multi-axis actuating apparatus 3 according to a second embodiment includes a first, second, and third actuators 341, 342, 343, first, second and third sets of guiding rods 321, 322, 323, first, second and third sets of guiding grooves (not shown), preload elements 33a, 33b, 33c, connection parts C1, C2, C3, a housing 35, a movable element 31 and a sample platform 36 attached to the movable element 31. In the present embodiment, one actuator drives a set of guiding rods. For example, each of the actuators 341, 342, 343 in the present embodiment are connected to four guiding rods (only three are shown for each actuator) and actuate the set of guiding rods simultaneously. The first actuator 341, the second actuator 342, and the third actuator 343 are configured to actuate and drive the guiding rods along the Z, Y and X directions, respectively. The first, second and third set of guiding rods are arranged perpendicular to one another.

The first, second and third actuators 341, 342, 343 each have one end connected to the housing 35 and the other end connected to the connection parts C1, C2, C3, respectively. The first, second, and third sets of guiding rods 321, 322, 323 have one end connected to the connection parts C1, C2 and C3, respectively and slidably and frictionally engage the movable element 31. In the example shown, the movable element 31 has a parallelepiped shape and includes six contact surfaces. The first, second and third sets of guiding rods contact different contact surfaces of the movable element 31.

It is understood that the movable element 31 may be a shape different from that shown without departing from the scope of the present disclosure.

When the first, second and third actuators 341, 342, 343 are actuated, the movable element 31 may be moved along Z, Y, and X axes.

In this embodiment, the actuators 341, 342, 343 do not move guiding rods directly. Instead, the actuators 341, 342, 343 move the connection plates C1, C2, C2, which in turn move the guiding rods 321, 322, 323.

The plurality of preload elements 33a, 33b, 33c contact the first, second and third set of guiding rods 321, 322, 323, respectively, to impose a force normal to interfaces between the guiding rods 321, 322, 323 and the movable element 31. Similar to the first embodiment, the guiding rods 321, 322, 323 are configured to transfer movements to the movable element 31. While the housing 35 is shown to have a hexahedron shape, the housing 35 can have other shapes, such as polyhedron, cylinder, awl shape, without departing from the scope of the present disclosure.

The first actuator 341 can be operated in the inertial stepping mode and scanning mode (driving mechanisms are mentioned in the multi-axis actuating apparatus 2) that moves the movable element 31 with millimeter scale coarse movement and sub nanometer scale high resolution scanning or positioning in Z axis, respectively. The second actuator 342 can be operated in inertial stepping mode and scanning mode that moves the movable element 31 with millimeter scale coarse movement and sub nanometer scale high resolution scanning or positioning in Y axis, respectively. The third actuator 343 can be operated in inertial stepping mode and scanning mode that moves the movable element 31 with millimeter scale coarse movement and sub nanometer scale high resolution scanning or positioning in X axis, respectively.

Third Embodiment

Referring to FIG. 9, a multi-axis actuating apparatus 3a according to a third embodiment of the present disclosure is similar to that of the third embodiment differing in that a fourth actuator 341 is similarly disposed along the Z axis. The fourth actuator 341 is juxtaposed with the first actuator 341 and parallel to the first actuator 341. In this embodiment, the first set of guiding rods 321 includes only two guiding rods 321. The fourth actuator 344 is connected to a connection plate C1a, which is connected to a fourth set of guiding rods 344. Similarly, the fourth set of guiding rods 344 includes only two guiding rods 344 and slidably and frictionally engage the movable element 21 (shown in FIG. 8).

Besides the inertial stepping and the scanning mode, the first actuator 341 and the fourth actuator 344 can be operated in angular inertial stepping mode and angular scanning mode (driving mechanisms are mentioned in the multi-axis actuating apparatus 2) that tilts the movable element 31 with large angular movement and high resolution angular scanning or positioning around Y axis, respectively. When different driving signals are applied to the first actuator 341 and the fourth actuator 344, the movable element 31 may have different displacement along the sides adjacent to the first actuator 341 and the fourth actuator 344. If the net moment of inertia applied to the movable element 31 is not zero, the movable element 31 can be titled. Therefore, the multi-axis actuating apparatus 3a provides four degrees of freedom (X,Y, Z, $\theta_Y$).

While not shown in figures, it is understood that a multi-axis actuating apparatus may have six actuators with two actuators arranged along each axis similar to FIG. 9. Therefore, the multi-axis actuating apparatus may have at least six degrees of freedom (X,Y, Z, $\theta_X$, $\theta_Y$, $\theta_Z$).

As mentioned before, one multi-axis actuating apparatus 3 can also replace coarse adjustment mechanism and fine scanning XYZ piezoelectric scanner in a SPM system. Referring to FIG. 10, a topographic image of a highly orientated pyrolytical graphite (HOPG) surface is measured by an atomic force microscope (one branch of scanning probe microscopy) which applies the single multi-axis actuating apparatus 3 as X,Y,Z coarse adjustment mechanism (operated in inertial stepping mode) and X,Y,Z fine scanner (operated in scanning mode). The cross-sectional analysis of the topographic image (indicated by white line in FIG. 10) is shown in FIG. 11. Two cursors indicate the vertical distance is 0.354 nm which is height of single carbon atomic layer. The measurement result of HOPG proves that the multi-axis actuating apparatus 3 can achieve sub-nanometer resolution when operated in scanning mode.

It is noted that the ratio of driving signal input and actuating distance should be calibrated in each of axis when multi-axis actuating apparatus 3 is operated in scanning mode. The known ratio can be used to predict movement of movable element 31 when applying specific driving signal.

The multi-axis actuating apparatus according to the present disclosure has a number of advantages. The movable element is frictionally coupled to multiple guiding rods for multiple-axis coarse, fine, angular coarse, angular fine actuations. Therefore, the parallel configuration of the multi-axis actuating apparatus has a higher stiffness, higher stability and higher vibration resistance then serial one. Furthermore, no actuator carries another actuator that imposes unnecessary loads, each axis actuation may be operated under the same working bandwidth and stiffness.

The present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. A multi-axis actuating apparatus for a positioning apparatus comprising:
   a movable element having a longitudinal axis;
   a platform attached to a longitudinal end of the movable element;
   a plurality of driving elements frictionally engaging and in contact with an outer peripheral surface of the movable element and selectively moving the movable element along a first direction parallel to the longitudinal axis due to frictional engagement between the driving elements and the outer peripheral surface of the movable element; and
   a plurality of actuators that move the plurality of driving elements along the first direction when driving signals are applied to the plurality of actuators,
   wherein different driving signals are applied to the plurality of actuators to cause different movement of the driving elements on the outer peripheral surface of the movable element such that the movable element has different displacements along the plurality of driving elements and is titled due to the different displacement.

2. The multi-axis actuating apparatus of claim 1, wherein the plurality of driving elements are guiding rods extending along the first direction.

3. The multi-axis actuating apparatus of claim 2, wherein the first direction is Z axis.

4. The multi-axis actuating apparatus of claim 1, wherein the plurality of driving elements include a first, a second, a third and a fourth guiding rods extending along Z axis.

5. The multi-axis actuating apparatus of claim 4, wherein the first and second guiding rods are aligned along X axis and the third and fourth guiding rods aligned along Y axis.

6. The multi-axis actuating apparatus of claim 5, wherein the movable element has an angular movement on an X-Z plane when the first and second guiding rods are actuated differently.

7. The multi-axis actuating apparatus of claim 6, wherein the platform has a linear movement along the X axis when the movable element has the angular movement on the X-Z plane.

8. The multi-axis actuating apparatus of claim 5, wherein the movable element has an angular movement on a Y-Z plane when the third and fourth guiding rods are actuated differently.

9. The multi-axis actuating apparatus of claim 1, further comprising a preload element surrounding the plurality of driving elements to maintain frictional engagement between the plurality of driving elements and the movable element.

10. The multi-axis actuating apparatus of claim 1, wherein the plurality of actuators are disposed on a same housing.

11. The multi-axis actuating apparatus of claim 1, wherein the plurality of actuators include a first actuator for moving a first set of the driving elements along X axis, a second actuator for moving a second set of the driving elements along Y axis, and a third set of the driving elements along Z axis.

12. The multi-axis actuating apparatus of claim 11, further comprising a first connection plate, a second connection plate, and a third connection plate, which connect the first, second, and third set of the driving elements to the first, second, and third actuators, respectively.

13. The multi-axis actuating apparatus of claim 12, wherein the movable element has a first surface, a second surface and a third surface that are perpendicular to one another, wherein the first, second, and third set of the driving elements frictionally engage the first, second and third surfaces, respectively.

14. The multi-axis actuating apparatus of claim 12, wherein the first, second and third set of driving elements each include four guiding rods.

15. The multi-axis actuating apparatus of claim 13, further comprising a fourth actuator, a fourth set of driving elements.

16. The multi-axis actuating apparatus of claim 15, wherein the fourth actuator is juxtaposed with one of the first, second, and third actuators.

17. The multi-axis actuating apparatus of claim 16, wherein the fourth actuator and the one of the first, second and third actuators are actuated differently to cause tilt or rotation of the moveable element.

18. The multi-axis actuating apparatus of claim 1, wherein the plurality of actuators include piezoelectric materials or magnetic linear motors.

19. The multi-axis actuating apparatus of claim 1, wherein the movable element has plurality of guiding grooves for guiding movement of the plurality of driving element.

20. The multi-axis actuating apparatus of claim 2, wherein the guiding rods have high axial stiffness that are made of carbon fiber or composites or metal alloy material.

21. The multi-axis actuating apparatus of claim 1, wherein the plurality of actuators include first and second actuators for moving first and second sets of the driving elements along X axis, third and fourth actuator for moving third and fourth sets of the driving elements along Y axis, and fifth and sixth actuators for moving fifth and sixth sets of the driving elements along Z axis.

22. The multi-axis actuating apparatus of claim 21, wherein the movable element has X,Y,Z linear movements along X,Y,Z axes and $\theta_X$, $\theta_Y$, $\theta_Z$ angular movements when the first, second, third, fourth, fifth and sixth sets of driving elements are actuated differently.

23. A multi-axis actuating apparatus comprising:
a movable element defining a first guiding groove and a second guiding groove;
a platform secured to the movable element;
a first guiding rod frictionally engaging the first guiding groove;
a second guiding rod frictionally engaging the second guiding groove;
a first actuator connected to the first guiding rod for moving the first guiding rod when the first actuator is actuated;
a second actuator connected to the second guiding rod for moving the second guiding rod when the second actuator is actuated; and
a housing that supports the first and second actuators,
wherein the first and second actuators are actuated differently to cause different displacement of the first and second guiding grooves, such that the movable element is titled.

* * * * *